United States Patent
Gopisetti et al.

(10) Patent No.: US 11,500,348 B2
(45) Date of Patent: Nov. 15, 2022

(54) SYSTEM AND METHOD FOR IMPROVED POWER UTILIZATION IN HART FIELD INSTRUMENT TRANSMITTERS TO SUPPORT BLUETOOTH LOW ENERGY

(71) Applicant: Honeywell International Inc., Morris Plains, NJ (US)

(72) Inventors: Santosh Gopisetti, Andra Pradesh (IN); Puspa Chaudhury, Hyderabad (IN)

(73) Assignee: Honeywell International Inc., Charlotte, NC (US)

( * ) Notice: Subject to any disclaimer, the term of this patent is extended or adjusted under 35 U.S.C. 154(b) by 1289 days.

(21) Appl. No.: 15/914,697

(22) Filed: Mar. 7, 2018

(65) Prior Publication Data

US 2019/0278246 A1    Sep. 12, 2019

(51) Int. Cl.
| | | |
|---|---|---|
| H04L 29/08 | (2006.01) | |
| G05B 19/042 | (2006.01) | |
| G06F 11/30 | (2006.01) | |
| H04L 69/08 | (2022.01) | |
| G06F 11/20 | (2006.01) | |
| H04L 67/12 | (2022.01) | |

(52) U.S. Cl.
CPC ..... G05B 19/0426 (2013.01); G05B 19/0421 (2013.01); G06F 11/202 (2013.01); G06F 11/2007 (2013.01); G06F 11/3065 (2013.01); H04L 67/12 (2013.01); H04L 69/08 (2013.01)

(58) Field of Classification Search
CPC ............ G05B 19/0426; G05B 19/0421; G05B 2219/25186; G05B 19/0423; G06F 11/2007; G06F 11/202; G06F 11/3065; G06F 11/2005; H04L 67/12; H04L 69/08; H04W 4/80
See application file for complete search history.

(56) References Cited

U.S. PATENT DOCUMENTS

| | | |
|---|---|---|
| 8,406,220 B2 | 3/2013 | McLaughlin et al. |
| 9,065,813 B2 | 6/2015 | Kolavennu et al. |

(Continued)

FOREIGN PATENT DOCUMENTS

WO    2016107981 A1    7/2016

OTHER PUBLICATIONS

Emerson Process Management, "475 Field Communicator," Product Data Sheet, May 2013, 8 pages.

(Continued)

*Primary Examiner* — Kim T Nguyen
(74) *Attorney, Agent, or Firm* — Ortiz & Lopez, PLLC; Kermit D. Lopez; Luis M. Ortiz

(57) ABSTRACT

A method includes determining, by a field instrument in an industrial process and control system, a Highway Addressable Remote Transducer (HART) mode of the field instrument. The method also includes, upon a determination, by the field instrument, that the HART mode is a HART On Demand mode, listening for a HART data signal from a HART master device; when the HART data signal is detected, communicating with the HART master device according to a HART protocol; and when the HART data signal is not detected, diverting a current supply allocated for HART communication to a BLUETOOTH Low Energy (BLE) transceiver for use in BLE communication, and communicating according to a BLE protocol.

20 Claims, 4 Drawing Sheets

(56) References Cited

U.S. PATENT DOCUMENTS

| | | |
|---|---|---|
| 9,405,285 B2 | 8/2016 | Powell et al. |
| 9,883,538 B2 * | 1/2018 | Kumar .................. H04W 12/50 |
| 2012/0230446 A1 * | 9/2012 | Feng .................. H04L 12/4625 |
| | | 709/227 |
| 2015/0276432 A1 | 10/2015 | Repyevsky et al. |
| 2017/0359675 A1 | 12/2017 | Gopalakrishnan et al. |
| 2018/0088646 A1 | 3/2018 | Chen et al. |
| 2018/0113602 A1 | 4/2018 | Gopalakrishnan et al. |

OTHER PUBLICATIONS

Honeywell International Inc., "Using Honeywell's Field Device Configurator for Simple and Efficient Instrument Maintenance," Aug. 2011, 6 pages.

\* cited by examiner

SYSTEM AND METHOD FOR IMPROVED POWER UTILIZATION IN HART FIELD INSTRUMENT TRANSMITTERS TO SUPPORT BLUETOOTH LOW ENERGY

TECHNICAL FIELD

This disclosure relates generally to industrial control systems and HART field instruments. More specifically, this disclosure relates to a system and method for improved power utilization in HART field instrument transmitters to support BLUETOOTH Low Energy.

BACKGROUND

Industrial process control and automation systems are often used to automate large and complex industrial processes, such as those in the chemical industry. These types of systems routinely include sensors, actuators, and controllers. The controllers typically receive measurements from the sensors and generate control signals for the actuators.

Such sensors and actuators comprise a group of devices commonly referred to field devices or field instruments. In production environments, field instruments often need to be accessed by a field technician to perform calibration, diagnostics, or other maintenance activities. In many cases, the field instruments are positioned in locations that are difficult or dangerous for a field technician to access.

SUMMARY

This disclosure provides a system and method for improved power utilization in HART field instrument transmitters to support BLUETOOTH Low Energy.

In a first embodiment, a method includes determining, by a field instrument in an industrial process and control system, a Highway Addressable Remote Transducer (HART) mode of the field instrument. The method also includes, upon a determination, by the field instrument, that the HART mode is a HART On Demand mode, listening for a HART data signal from a HART master device; when the HART data signal is detected, communicating with the HART master device according to a HART protocol; and when the HART data signal is not detected, diverting a current supply allocated for HART communication to a BLUETOOTH Low Energy (BLE) transceiver for use in BLE communication, and communicating according to a BLE protocol.

In a second embodiment, a field instrument for use in an industrial process and control system comprises at least one memory configured to store instructions and at least one processing device. The at least one processing device is configured when executing the instructions to determine a HART mode of the field instrument. The at least one processing device is configured when executing the instructions to, upon a determination that the HART mode is a HART On Demand mode, listen for a HART data signal from a HART master device; when the HART data signal is detected, communicate with the HART master device according to a HART protocol; and when the HART data signal is not detected, divert a current supply allocated for HART communication to a BLE transceiver for use in BLE communication, and communicate according to a BLE protocol.

In a third embodiment, a non-transitory computer readable medium contains instructions that, when executed by at least one processing device, cause the at least one processing device to determine a HART mode of the field instrument. The instructions also cause the at least one processing device to, upon a determination that the HART mode is a HART On Demand mode: listen for a HART data signal from a HART master device; when the HART data signal is detected, communicate with the HART master device according to a HART protocol; and when the HART data signal is not detected, divert a current supply allocated for HART communication to a BLE transceiver for use in BLE communication, and communicate according to a BLE protocol.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

For example.

DETAILED DESCRIPTION

The figures discussed below and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
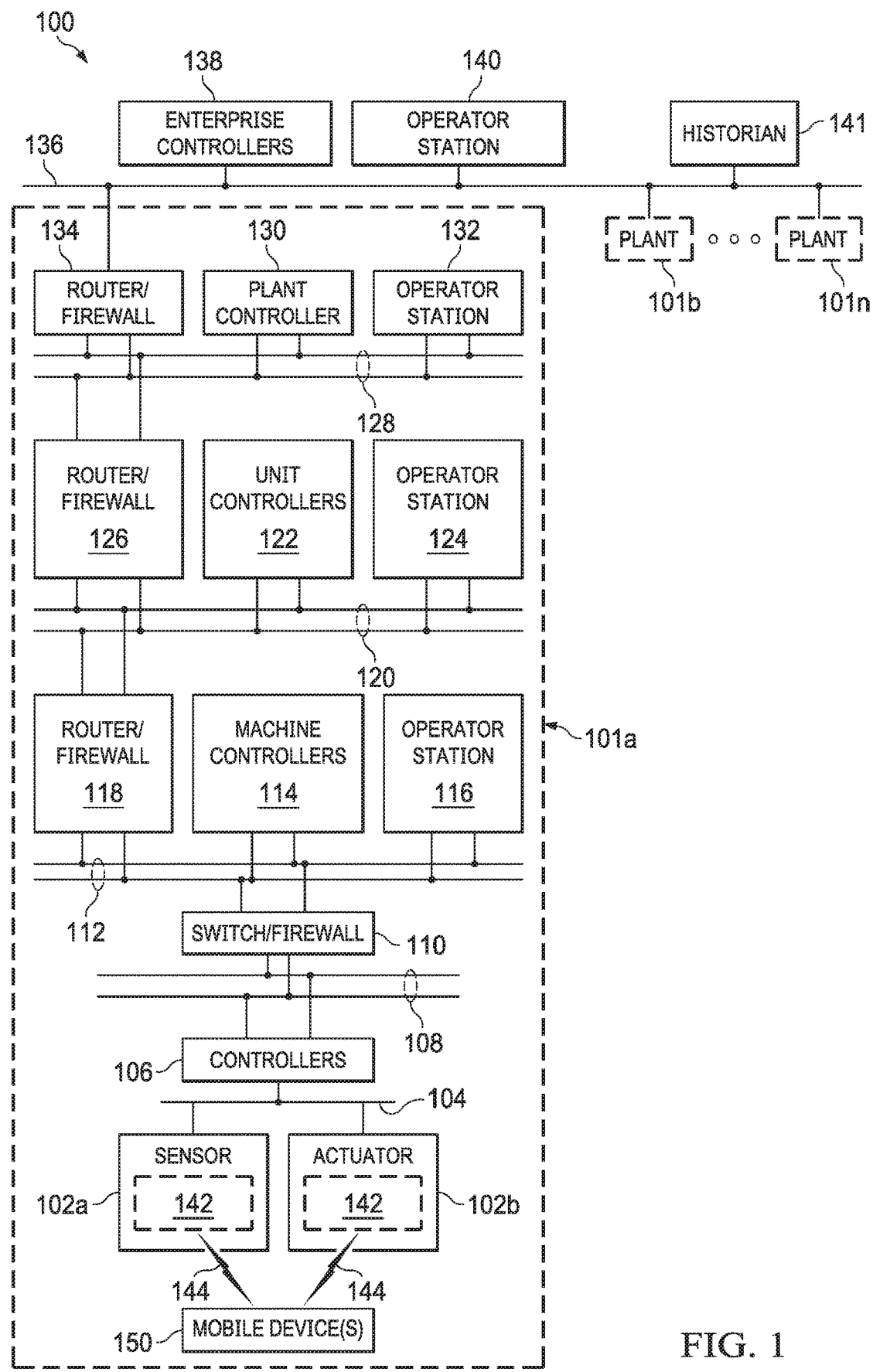
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b (also collectively referred to as field instruments 102). The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART (Highway Addressable Remote Transducer) or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Multiple controllers 106 could also operate in redundant configurations, such as when one controller 106 operates as a primary controller while another controller 106 operates as a backup controller (which synchronizes with the primary controller and can take over for the primary controller in the event of a fault with the primary controller). Each controller 106 includes any suitable structure for interacting with one or more sensors 102a and controlling one or more actuators 102b. Each controller 106 could, for example, represent a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various supervisory functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Additionally or alternatively, each controller 114 could represent a multivariable controller embedded in a Distributed Control System (DCS), such as a RMPCT controller or other type of controller implementing MPC or other APC. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Additionally or alternatively, each controller 122 could represent a multivariable controller, such as a HONEYWELL C300 controller. Although not shown, different unit-level controllers 122 could be used to control different units in a process system (where each unit is associated with one or more machine-level controllers 114, controllers 106, sensors 102*a*, and actuators 102*b*).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101*a*-101*n*, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101*a*-101*n* and to control various aspects of the plants 101*a*-101*n*. The enterprise-level controllers 138 can also perform various functions to support the operation and control of components in the plants 101*a*-101*n*. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101*a* is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers and operator stations could include one or more processing devices and one or more memories for storing instructions and data used, generated, or collected by the processing device(s). Each of the controllers and operator stations could also include at least one network interface, such as one or more Ethernet interfaces or wireless transceivers.

In industrial process control and automation systems such as the system 100, technicians often use handheld communicators, such as a HONEYWELL field device configurator (FDC) or a similar communication device, to access field instruments for calibration, performing diagnostics, and the like. The field instruments include or are connected to field transmitters (also referred to as "smartline transmitters") that use industrial protocols (such as HART and FOUNDATION FIELDBUS protocols) in the field.

Many field instrument displays have a number of limitations, including minimal backlighting capabilities, diagnostic indications, advanced hue and animation capabilities, and the like. Modifying the field instrument configuration, and monitoring of process variables (such as temperature or pressure) and diagnostics in field instruments that are installed in difficult to access areas (e.g., installation at heights or at extreme temperature, pressure conditions, etc.) can be a challenge. For mid-segment installations or OEM installations, an end user (e.g., an operator or field engineer) may not have access to an asset management system to configure or monitor diagnostics. Thus, the user relies on handheld configurators for configuration and monitoring activities. Such hand held configurators are costly.

Furthermore, in many industrial process control and automation systems, current logging solutions use separate cables from the field instrument to the data loggers to log the data. This involves considerable cost in cabling, installation, and maintenance. Also, data loggers and SCADA (Supervisory Control And Data Acquisition) systems are comparatively costly and cannot access other parameters apart from process variables when integrated with a programmable logic controller (PLC), which typically does not have HART capabilities.

To address these and other issues, BLUETOOTH Low Energy (BLE) capabilities can be added to the HART transmitter of a field instrument. For example, one or more of the field instruments 102 (e.g., the sensors 102a, the actuators 102b, or any other suitable field instrument(s)) can include or be connected to a BLE transceiver 142 configured for BLE communication with a mobile device 150 over a BLE communication link 144. The mobile device 150 represents a wireless communication device such as a smart phone, tablet, laptop, and the like. The mobile device 150 is configured to access field instrument parameters over the BLE communication link 144.

In many BLE-enabled systems, a power accumulation circuit is provided in the transmitter to enable BLE communication. However, power availability and additional cost for a power accumulation circuit in the transmitter adds a major challenge to a practical, workable solution. Because such transmitters are limited in power use (e.g., they often operate on 4V DC, although other voltages are possible) and must adhere to communication and power usage standards, there is little extra power available for BLE communication.

In accordance with this disclosure, the field instruments 102 are configured for BLE communication capabilities without adding power accumulation circuitry in the transmitter. In particular, the field instruments 102 use power already available for HART communication to enable BLE communication as needed. Additional details regarding functionality are provided below.

Although FIG. 1 illustrates one example of an industrial process control and automation system 100, various changes may be made to FIG. 1. For example, a control system could include any number of sensors, actuators, controllers, servers, operator stations, networks, and safety managers. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, process control systems are highly configurable and can be configured in any suitable manner according to particular needs.

As discussed above, some existing systems have a number of limitations for configuring and diagnosing field instruments. Some field instruments have no information display, or the information display is very limited (i.e., one or two lines of alphanumeric characters). Thus, it is difficult or impossible for the user to diagnose conditions or even determine a 'Power On' condition by mere examination of the field instrument. In such cases, the user must rely on an asset management system or handheld to diagnose or configure the field instrument.

Other field instruments are used in small scale industries and rely on data loggers or SCADA systems to log the data. However, such solutions involve significant wiring and related maintenance. Also, such SCADA systems, data logging systems, and related wiring systems are costly. In some field instruments that already include capabilities for wireless communication, it is necessary for the user to open the transmitter at the field instrument in order to configure the transmitter to communicate with the user's handheld device. This is not user friendly. In addition, there may be one or more user limitations in intrinsic safe zones, and one or more approvals may be required.

The embodiments disclosed herein offer a number of advantages. For example, the user can view diagnostic information of a field instrument without relying on a control room or a visual inspection of the field instrument. Using the disclosed embodiments, the diagnostic status of the field instrument can be known, even from a distance or when the field instrument is not currently visible to the user. This is very useful for small scale or mid-tier industries where asset management systems are not used and are run by PLCs. Also, in accordance with the disclosed embodiments, BLE-based data logging and control can be used. This requires no wires or associated maintenance. This is very useful for OEMs and small scale industries. It represents a low cost solution for data logging. Also, BLE-based firmware can be downloaded wirelessly, which is user friendly.

As discussed above, in many systems where HART-enabled field instruments are installed, the HART communication capability of the field instrument is continuously available (i.e., always on). That is, the ability of the field instrument to communicate with other devices using the HART protocol is always present (and the power to communicate using the HART protocol is always available), even though it is rarely used (sometimes as infrequently as a few times a year for configuration or maintenance). For example, HART capabilities might only be used for field instrument configuration purposes, using handheld configurators or other asset management hosts. Typically, the HART protocol is not used for process control due to slow update rates, as compared to analog loop currents. When the field instrument communicates with a HART master using the HART protocol, the current allocated for HART communication is used. When there is no HART communication, the unused current can be utilized to integrate the advanced features described herein in accordance with this disclosure.

Figure 2A:
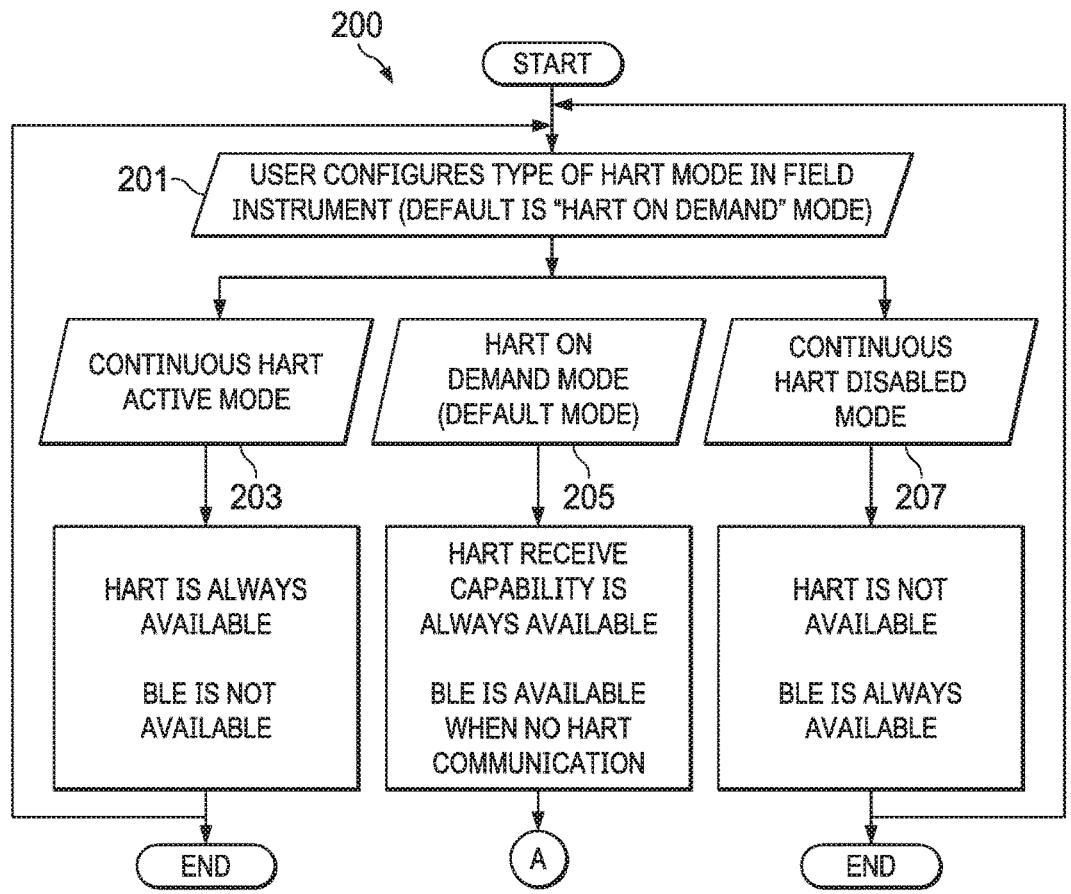
FIGS. 2A and 2B illustrate a process that can be used for different HART modes to support BLUETOOTH low energy (BLE) communication in the system of FIG. 1 according to this disclosure.
Figure 2B:
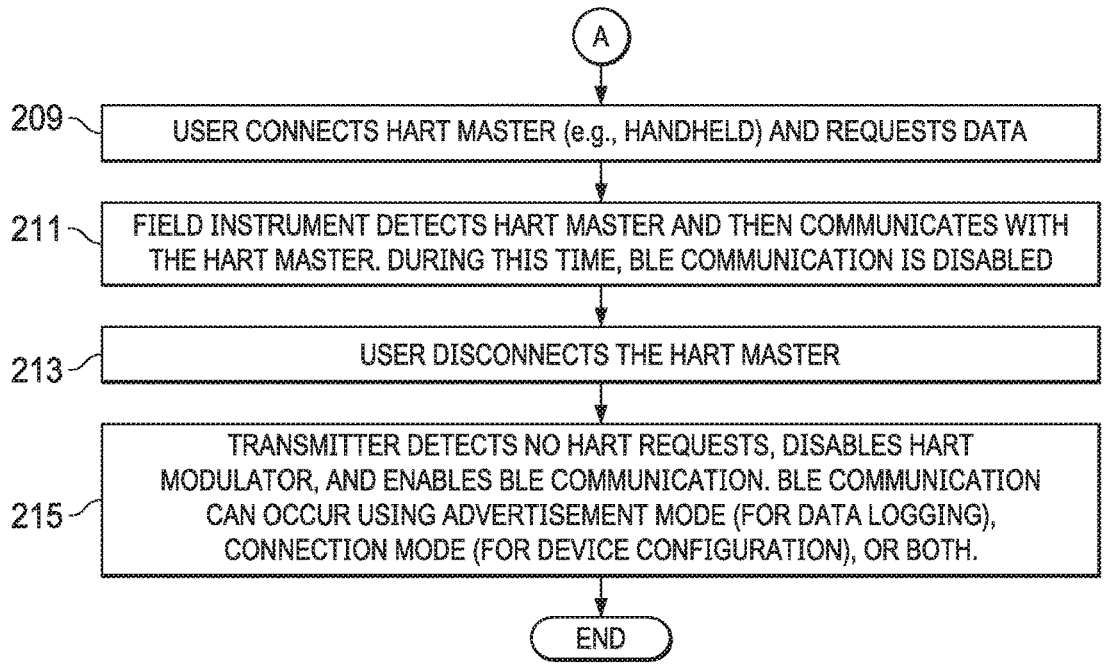

FIGS. 2A and 2B illustrate a process 200 that can be used for different HART modes to support BLE communications according to this disclosure. Using the process 200, the HART capability in a field instrument can be configurable by a user. The process 200 can be performed in conjunction with a HART-enabled field instrument, such as one of the field instruments 102 of FIG. 1. Of course, the process 200 can also be used with any other suitable device or system.

At operation 201, a user selects a HART mode of a field instrument from multiple possible HART modes available at the field instrument. In some embodiments, the user may select from a "Continuous HART Active" mode 203, a "HART On Demand" mode 205, and a "Continuous HART Disabled" mode 207, which are described below. The HART mode may be selectable by the user by actuating a software or hardware jumper or switch at the field instrument. At the time of manufacture or installation, the field instrument may be configured with a default HART mode. In some embodiments, the default HART mode is the "HART On Demand" mode 205.

"Continuous HART Active" Mode 203:

In this mode, the field instrument is always capable of communicating using the HART protocol. That is, the HART capability is always active and available. In this mode, since power is allocated for possible HART communication, BLE communication is not available.

"HART on Demand" Mode 205:

In some embodiments, this is the default mode of the field instrument. In this mode, the HART receive capability is always enabled in the HART transmitter of the field instrument. That is, the HART demodulator is active, while the HART modulator may be inactive. However, the HART transmit circuit will be active only when a HART master is connected to the field instrument and valid communication (e.g., reception) is detected. In this mode, the current that is utilized for HART communication will be diverted to support BLE communication until no valid HART communication is detected. When there is no HART communication (i.e., no request received from the HART master), BLE communication is activated. When the BLE communication is activated, process variable, Tag information, and Device critical diagnostics can be advertised continuously.

Figure 3:
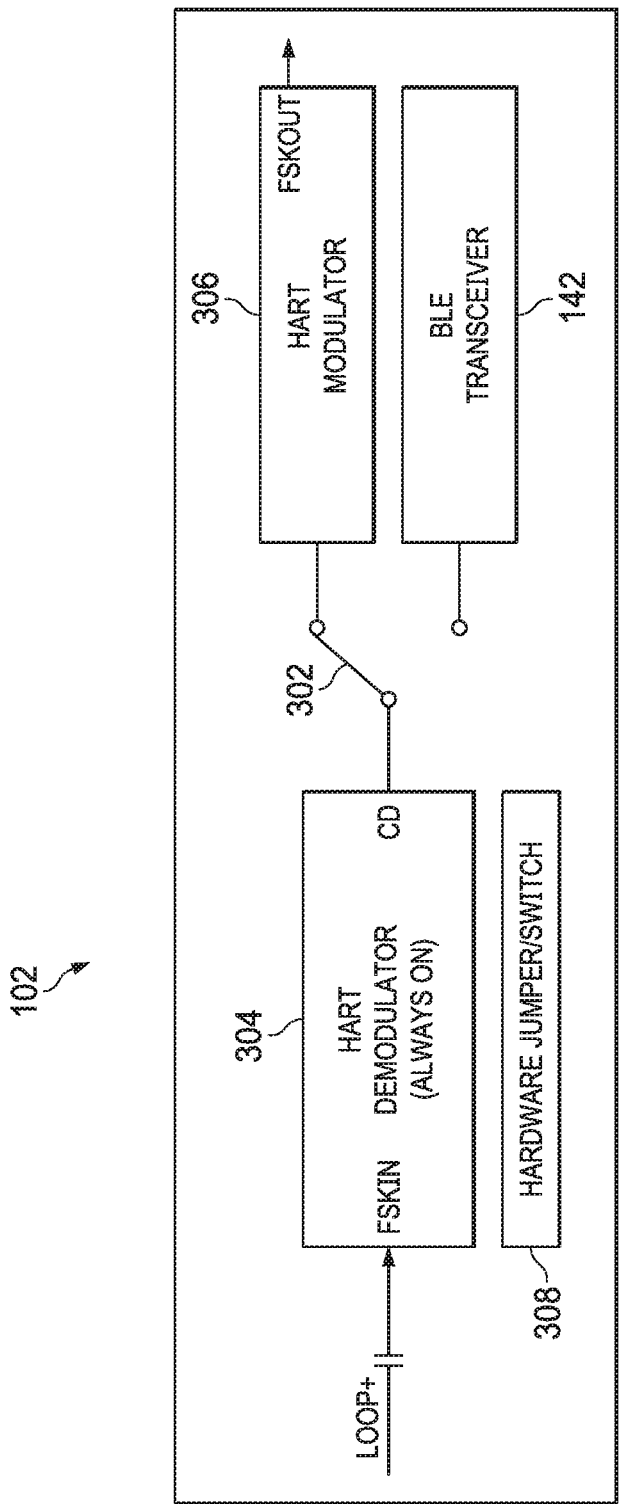
FIG. 3 illustrates a field instrument configured for improved power utilization according to this disclosure.

For example, FIG. 3 illustrates a field instrument 102 configured for improved power utilization according to this disclosure. As shown in FIG. 3, the field instrument 102 includes a software or hardware switch 302, a HART demodulator 304, a HART modulator 306, a software or hardware jumper or switch 308, and the BLE transceiver 142. During operation, the HART demodulator 304 is always enabled in order to listen for a HART master. When there is no HART communication detected, the processor or controller of the field instrument 102 can control the switch 302 to divert current allocated for HART communication to the BLE transceiver 142 for BLE communication. When valid HART communication is detected (i.e., the carrier detect is asserted), the current can be provided to the HART modulator 306 for normal HART communication. This whole operation is transparent to the user.

"Continuous HART Disabled" Mode 207:

In this mode, the field instrument is not capable of communicating using the HART protocol. That is, the HART capability is disabled. Instead, the current available for HART communication is allocated to BLE communication, which is always available in this mode.

By default, the field instrument can be configured for the "HART On Demand" mode 205. This mode allows both HART and BLUETOOTH capability, as needed. In this mode, there may be no need for the user to change to a different mode. However, the user may be able to change to the other modes 203, 207 by actuating the jumper or hardware/software switch 308 at the field instrument.

When the field instrument is in the "HART On Demand" mode 205, the process 200 continues to operation 209. At operation 209, a user connects a HART master (e.g., a handheld configurator device) to the field instrument, and requests data from the field instrument using the HART protocol.

At operation 211, the HART transmitter of the field instrument detects the data signal from the HART master (e.g., the HART carrier detect is asserted), and enables the HART modulator. The field instrument and the HART master can then communicate using the HART protocol. For example, the user's handheld configurator device can configure the field instrument. During this time, BLE communication is temporarily disabled.

At operation 213, the user disconnects the HART master (e.g., the handheld configurator device) from the field instrument.

At operation 215, once the HART master is disconnected, there are no longer any HART requests. The HART transmitter detects the absence of the HART requests, waits for a predetermined period of time (e.g., 2 or 3 seconds), disables the HART modulator, and enables BLE communication using the switch.

The BLE communication protocol includes multiple modes of communication. Two of these communication modes—Advertisement mode and Connection mode—are frequently used. In Advertisement mode, no connection event takes place between a BLE transmitter and a BLE receiver. Instead, the BLE transmitter simply transmits advertisement messages that can be received by the BLE receiver. In Connection mode, two BLE devices establish a two-way communication channel for receiving and transmitting data.

During operation 215, the HART transmitter enables the field instrument for BLE communication using the Advertisement mode, the Connection mode, or both, depending on the circumstances. The Advertisement mode can be used for data logging, while the Connection mode can be used for device configuration. Both of these will now be described.

BLE-Based Data Logging

In the Advertisement mode, the field instrument can send BLE advertisement messages comprising information for data logging. The field instrument publishes an identifier or "tag" of the field instrument, a value of a process variable associated with the field instrument (e.g., temperature, pressure, etc.), one or more diagnostics of the field instrument, and any other critical data (as needed) in advertisement packets according to a predetermined advertisement rate. A BLE-enabled device (e.g., the mobile device 150) in proximity to (i.e., within BLUETOOTH communication range of) the field instrument can detect the BLE advertisement packets and receive the advertised data. The BLE-enabled device does not even need to establish a BLE connection with the field instrument in order to receive the advertisement packets from the field instrument. Once received, the data can be sent to an application or a repository (e.g., the data historian 141 of FIG. 1) for data logging or monitoring purposes.

With this approach, an existing 4-20 mA Loop current update including HART communication can be performed simultaneously without any impact by proper scheduling. The average current demand that is required for this operation can be achieved with the disclosed power optimization techniques. In some embodiments, a small capacitor may be added to existing circuitry to enable the approach.

BLE-Based Device Configuration

In the Connection mode, the field instrument can establish a BLE communication channel with a handheld device (e.g., the mobile device 150) to support device configuration, firmware upgrades, or both. In this mode, the field instrument is placed in maintenance mode or taken out of service. The field instrument can be placed in a fixed current mode by configuring the loop powered digital-to-analog converter (DAC). Once in fixed current mode, the field instrument can be paired with the handheld device. The handheld device can then send configuration data or firmware updates to the field instrument, and receive status information in return.

Before pairing the field instrument and the handheld device using BLE, there may be a notification indicating that loop current will be temporarily disabled. In many cases during device configuration or troubleshooting, the field instrument is taken out of service. Thus, disabling the loop current will not impact the configuration process.

As discussed herein, the current or power reserved for HART communication can be made available for BLE communication. In some embodiments, additional current or power can also be used.

Figure 4:
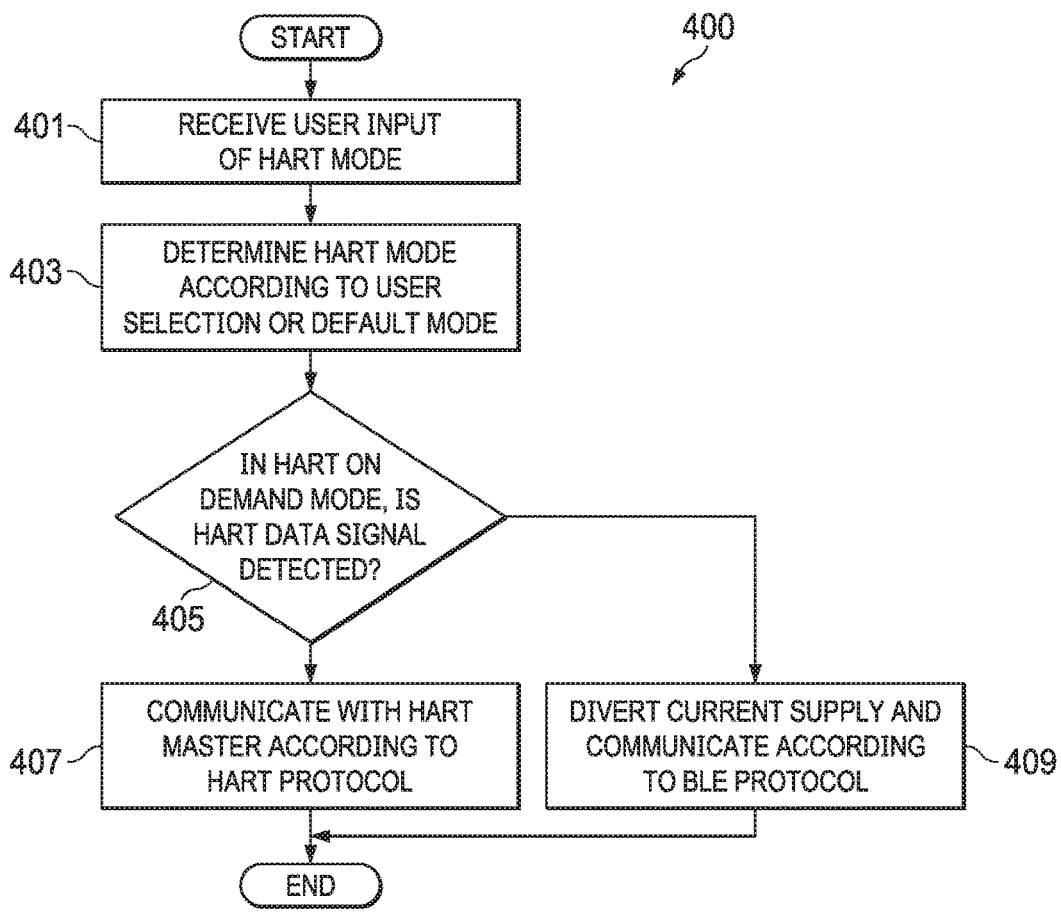
FIG. 4 illustrates an example method for improved power utilization in a field instrument in a process control system according to this disclosure.

FIG. 4 illustrates an example method 400 for improved power utilization in a field instrument in a process control system according to this disclosure. For ease of explanation, the method 400 is described as being performed using the field instrument 102 and the mobile device 150. However, the method 400 could be used with any suitable device, system, or application.

At step 401, the field instrument receives a user input of a selection of a HART mode for the field instrument. In some embodiments, the HART mode is selected from a plurality of available HART modes, including a Continuous HART Active mode, a Continuous HART Disabled mode, and a HART On Demand mode. In some embodiments, the selection of the HART mode comprises actuation of a software or hardware jumper or switch at the field instrument.

At step 403, the field instrument determines the HART mode according to a default mode or according to the user input.

At step 405, upon a determination that the HART mode is the HART On Demand mode, the field instrument listens for a HART data signal from a HART master device. If a HART data signal is detected, the method 400 proceeds to step 407. If a HART data signal is not detected, the method 400 proceeds to step 409.

At step 407, when a HART data signal is detected, the field instrument communicates with the HART master device according to a HART protocol. This may include providing the current supply allocated for HART communication to a HART modulator of the field instrument. This may also include transmitting data to or receiving data from the HART master device.

At step 409, when a HART data signal is not detected, the field instrument diverts the current supply allocated for HART communication to a BLE transceiver for use in BLE communication. The field instrument then communicates according to a BLE protocol. This may include, in a BLE advertisement mode, transmitting one or more BLE advertisement packets comprising an identifier of the field instrument, a process variable associated with the field instrument, and one or more diagnostics of the field instrument. Additionally or alternatively, this may include pairing the field instrument with a device according to the BLE protocol, and in a BLE connection mode, receiving at least one of configuration data and firmware upgrade data from the device.

Although FIG. 4 illustrates one example of a method 400 for improved power utilization in a field instrument in a process control system, various changes may be made to FIG. 4. For example, while shown as a series of steps, various steps shown in FIG. 4 could overlap, occur in parallel, occur in a different order, or occur multiple times. Moreover, some steps could be combined or removed and additional steps could be added according to particular needs.

Figure 5:
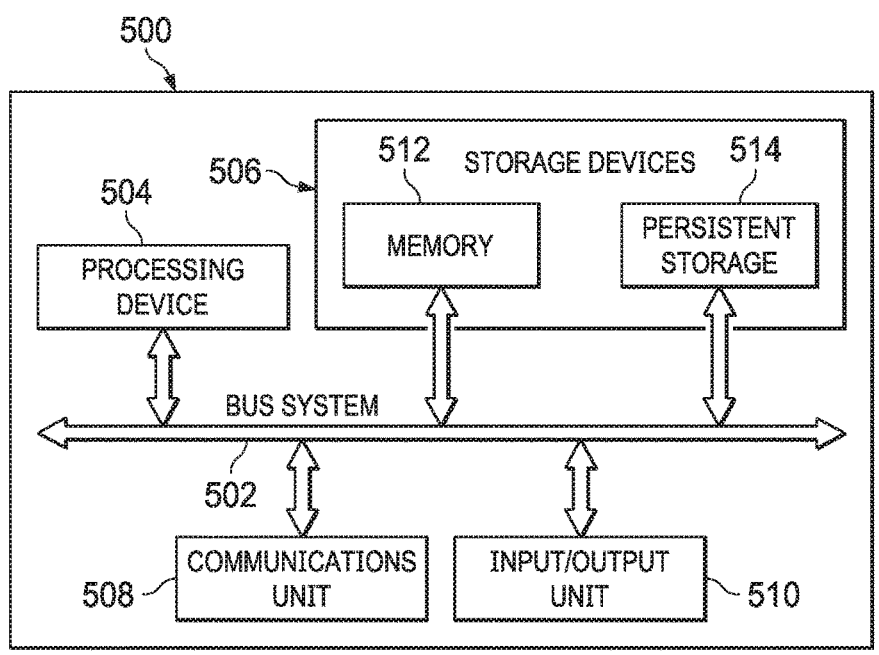
FIG. 5 illustrates an example device for improved power utilization in a field instrument in a process control system according to this disclosure.

FIG. 5 illustrates an example device 500 for improved power utilization in a field instrument in a process control system according to this disclosure. The device 500 could, for example, represent the mobile device 150. Additionally or alternatively, portions of the device 500 could represent portions of the field instrument 102. The device 500 could represent any other suitable device for improved power utilization in a field instrument in a process control system.

As shown in FIG. 5, the device 500 can include a bus system 502, which supports communication between at least one processing device 504, at least one storage device 506, at least one communications unit 508, and at least one input/output (I/O) unit 510. The processing device 504 executes instructions that may be loaded into a memory 512.

The processing device 504 may include any suitable number(s) and type(s) of processors or other devices in any suitable arrangement. Example types of processing devices 504 include microprocessors, microcontrollers, digital signal processors, field programmable gate arrays, application specific integrated circuits, and discrete circuitry.

The memory 512 and a persistent storage 514 are examples of storage devices 506, which represent any structure(s) capable of storing and facilitating retrieval of information (such as data, program code, and/or other suitable information on a temporary or permanent basis). The memory 512 may represent a random access memory or any other suitable volatile or non-volatile storage device(s). The persistent storage 514 may contain one or more components or devices supporting longer-term storage of data, such as a ready only memory, hard drive, Flash memory, or optical disc. In accordance with this disclosure, the memory 512 and the persistent storage 514 may be configured to store instructions associated with improved power utilization in a field instrument in a process control system.

The communications unit 508 supports communications with other systems, devices, or networks. For example, the communications unit 508 could include a network interface that facilitates communications over at least one Ethernet network. The communications unit 508 could also include a wireless transceiver facilitating communications over at least one wireless network. The communications unit 508 may support communications through any suitable physical or wireless communication link(s).

The I/O unit 510 allows for input and output of data. For example, the I/O unit 510 may provide a connection for user input through a keyboard, mouse, keypad, touchscreen, or other suitable input device. The I/O unit 510 may also send output to a display, printer, or other suitable output device.

Although FIG. 5 illustrates one example of a device 500 for improved power utilization in a field instrument in a process control system, various changes may be made to FIG. 5. For example, various components in FIG. 5 could be combined, further subdivided, or omitted and additional components could be added according to particular needs. Also, computing devices can come in a wide variety of configurations, and FIG. 5 does not limit this disclosure to any particular configuration of device.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. A controller may be implemented in hardware or a combination of hardware and software/firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   determining, by a field instrument in an industrial process and control system, a Highway Addressable Remote Transducer (HART) mode of the field instrument; and
   upon a determination, by the field instrument, that the HART mode is a HART On Demand mode:
      listening for a HART data signal from a HART master device;
      when the HART data signal is detected, communicating with the HART master device according to a HART protocol; and
      when the HART data signal is not detected, diverting a current supply allocated for HART communication to a BLUETOOTH Low Energy (BLE) transceiver for use in BLE communication and communicating with a BLE-enabled device according to a BLE protocol.

2. The method of claim 1, wherein communicating with the HART master device according to the HART protocol comprises:
   providing the current supply allocated for HART communication to a HART modulator of the field instrument; and
   at least one of transmitting data to or receiving data from the HART master device.

3. The method of claim 2, wherein diverting the current supply allocated for HART communication to the BLE transceiver comprises:
   controlling a switch to divert the current supply from the HART modulator to the BLE transceiver.

4. The method of claim 1, wherein communicating according to the BLE protocol comprises:
   in a BLE advertisement mode, transmitting one or more BLE advertisement packets comprising an identifier of the field instrument, a process variable associated with the field instrument, and one or more diagnostics of the field instrument.

5. The method of claim 4, wherein the one or more BLE advertisement packets are transmitted to the BLE-enabled device in proximity to the field instrument, the BLE-enabled device configured to send at least one of the identifier of the field instrument, the process variable associated with the field instrument, and the one or more diagnostics of the field instrument to a historian for data logging.

6. The method of claim 1, wherein communicating according to the BLE protocol comprises:
   pairing the field instrument with a device according to the BLE protocol; and
   in a BLE connection mode, receiving at least one of configuration data and firmware upgrade data from the device.

7. The method of claim 1, further comprising:
   receiving a user input of a selection of the HART mode, wherein the HART mode is selected from a plurality of available HART modes, the plurality of available HART modes comprising a Continuous HART Active mode, a Continuous HART Disabled mode, and the HART On Demand mode.

8. The method of claim 7, wherein the selection of the HART mode comprises actuation of a hardware jumper at the field instrument.

9. A field instrument for use in an industrial process and control system, the field instrument comprising:
   at least one memory configured to store instructions; and
   at least one processing device configured when executing the instructions to:
      determine a Highway Addressable Remote Transducer (HART) mode of the field instrument; and
      upon a determination that the HART mode is a HART On Demand mode:
         listen for a HART data signal from a HART master device;
         when the HART data signal is detected, communicate with the HART master device according to a HART protocol; and
         when the HART data signal is not detected, divert a current supply allocated for HART communication to a BLUETOOTH Low Energy (BLE) transceiver for use in BLE communication, and communicate with a BLE-enabled device according to a BLE protocol.

10. The field instrument of claim 9, wherein to communicate with the HART master device according to the HART protocol, the at least one processing device is configured to:
    provide the current supply allocated for HART communication to a HART modulator of the field instrument; and
    at least one of transmit data to or receive data from the HART master device.

11. The field instrument of claim 10, wherein to divert the current supply allocated for HART communication to the BLE transceiver, the at least one processing device is configured to:
    control a switch to divert the current supply from the HART modulator to the BLE transceiver.

12. The field instrument of claim 9, wherein to communicate according to the BLE protocol, the at least one processing device is configured to:
    in a BLE advertisement mode, transmit one or more BLE advertisement packets comprising an identifier of the field instrument, a process variable associated with the field instrument, and one or more diagnostics of the field instrument.

13. The field instrument of claim 12, wherein the at least one processing device is configured to transmit the one or more BLE advertisement packets to the BLE-enabled device in proximity to the field instrument, the BLE-enabled device configured to send at least one of the identifier of the field instrument, the process variable associated with the field instrument, and the one or more diagnostics of the field instrument to a historian for data logging.

14. The field instrument of claim 9, wherein to communicate according to the BLE protocol, the at least one processing device is configured to:
   pair the field instrument with a device according to the BLE protocol; and
   in a BLE connection mode, receive at least one of configuration data and firmware upgrade data from the device.

15. The field instrument of claim 9, wherein the at least one processing device is further configured to:
   receive a user input of a selection of the HART mode, wherein the HART mode is selected from a plurality of available HART modes, the plurality of available HART modes comprising a Continuous HART Active mode, a Continuous HART Disabled mode, and the HART On Demand mode.

16. The field instrument of claim 15, wherein the selection of the HART mode comprises actuation of a hardware jumper at the field instrument.

17. A non-transitory computer readable medium containing instructions that, when executed by at least one processing device of a field instrument in an industrial process and control system, cause the at least one processing device to:
   determine a Highway Addressable Remote Transducer (HART) mode of the field instrument; and
   upon a determination that the HART mode is a HART On Demand mode:
      listen for a HART data signal from a HART master device;
      when the HART data signal is detected, communicate with the HART master device according to a HART protocol; and
      when the HART data signal is not detected, divert a current supply allocated for HART communication to a BLUETOOTH Low Energy (BLE) transceiver for use in BLE communication, and communicate with a BLE-enabled device according to a BLE protocol.

18. The non-transitory computer readable medium of claim 17, wherein the instructions to communicate with the HART master device according to the HART protocol comprise instructions to:
   provide the current supply allocated for HART communication to a HART modulator of the field instrument; and
   at least one of transmit data to or receive data from the HART master device.

19. The non-transitory computer readable medium of claim 18, wherein the instructions to divert the current supply allocated for HART communication to the BLE transceiver comprise instructions to:
   control a switch to divert the current supply from the HART modulator to the BLE transceiver.

20. The non-transitory computer readable medium of claim 17, wherein the instructions to communicate according to the BLE protocol comprise instructions to:
   in a BLE advertisement mode, transmit one or more BLE advertisement packets comprising an identifier of the field instrument, a process variable associated with the field instrument, and one or more diagnostics of the field instrument.

* * * * *